United States Patent
Aragones et al.

[11] Patent Number: 6,067,486
[45] Date of Patent: May 23, 2000

[54] METHOD AND SYSTEM FOR PLANNING REPAIR OF AN AIRCRAFT ENGINE

[75] Inventors: James Kenneth Aragones, Clifton Park; Charles Edward Eaker, Schenectady; Russell Robert Irving, Ballston Lake; Mark Mitchell Kornfein, Latham, all of N.Y.; Steven Thomas Livingston, Arkansas City, Kans.; Brian Thomas Ovington, Mainville, Ohio

[73] Assignee: General Electric Company, Schenectady, N.Y.

[21] Appl. No.: 09/241,168

[22] Filed: Feb. 1, 1999

[51] Int. Cl.[7] ...................................................... G06F 19/00
[52] U.S. Cl. ................................ 701/29; 701/30; 340/500
[58] Field of Search .......................... 701/29, 30; 340/500

[56] References Cited

U.S. PATENT DOCUMENTS

| | | | |
|---|---|---|---|
| 5,778,381 | 7/1998 | Sandifer | 707/104 |
| 5,828,969 | 10/1998 | Chamney et al. | 701/29 |
| 5,838,261 | 11/1998 | Lauta et al. | 340/945 |
| 5,884,202 | 3/1999 | Arjomand | 701/29 |
| 5,931,877 | 8/1999 | Smith et al. | 701/29 |
| 5,931,878 | 8/1999 | Chapin, Jr. | 701/30 |

*Primary Examiner*—William A. Cuchlinski, Jr.
*Assistant Examiner*—Olga Hernandez
*Attorney, Agent, or Firm*—Dave C. Goldman; Jill M. Breedlove

[57] ABSTRACT

A method and system for planning repair or overhaul of an aircraft engine. This invention retrieves engine configuration data for a plurality of life limited parts for the aircraft engine, retrieves service requirement data for at least one of the plurality of life limited parts for the aircraft engine, and automatically determines a remaining life for the at least one of the plurality of life limited parts of the aircraft engine from the configuration data and the service requirement data.

20 Claims, 17 Drawing Sheets

[ *Home* | Special Items | Life Limited Parts | Mandatory SB's | Shop Modules | Required SB's | *Help* ]
[ Workscope life Page MCPH Sensitivity Page | LLP Usage | Engine Event History | Planning Document | Sign-Off Document |
Regenerate Call-Outs | Refresh Pages ]
[ Workscope Tool Restart | Select Another Workscope ]

Enter the desired information below then click on the Update Workscope button at the bottom to commit your changes into the data base.

Workorder:
Customer:
    Model:  CFM56-2C           TSN: 19079 Hours
      ESN:                      TSV:  2954 Hours
Build Cycles: 4004 cycles      CSN:  8680 Cycles
Build Usage:  2-C1             CSV:  1163 Cycles Reason for removal:  STALL/ROLL IN INVEST Day    Month    Year
Removal Date:        20    Oct      1998

Removal Station:

FIG. 4A

Repair Category: ESV2

Repair Description: (8 characters, maximum)

Summary of previous shop visits:

Shop visit #01: 09 Sep   - HPT BLADE DISTRESS Work orders: NO WORKORDERS FO
Shop visit #02: 05 Mar   - VIBRATION NCF Work orders: NO WORKORDERS FOUND
Shop visit #03: 07 Jun   - FLAMEOUT-N. CAUSE FD Work orders: NO WORKORDERS
Shop visit #04: 26 May   - LLP HPT FRONT SHAFT Work orders:

Special engine test requirements:

None

Additional instructions/comments:

None

Update Workscope          Revert to last saved values

FIG. 4B

[ Home | Special Items | *Life Limited Parts* | Mandatory SB's | Shop Modules | Required SB's | *Help* ]

LLP Off-Log

Select the Disposition for each LLP by making a selection from the button in the Disposition column. The current selection is high-lighted in the list that pops up. Then click on the Update LLP Disposition button at the bottom of the page to enter your changes into the data base.

To review the cycle usage history of these LLPs go to the LLP Usage Summary page.

LLPs with cycles remaining less than the 0 cycle build level to be achieved are marked in Red.

| Disposition | LLP | P/N | S/N | Total | | | 2-C1 | | Extension SBs |
| --- | --- | --- | --- | --- | --- | --- | --- | --- | --- |
| | | | | Hours Used | Cycles Used | Cycle Limit | Cycles Left | | |
| 21X - FAN ROTOR MODULE | | | | | | | | | |
| ▶ Continue | 211 - SPOOL - BOOSTER | 305-026-611-0 | JN00 | 19079 | 8680 | 25000 | 16320 | | |
| ▶ Continue | 213 - DISK - STG 1 | 305-048-815-0 | JN00 | 19079 | 8680 | 25000 | 16320 | | |
| 22X - NO 1 & 2 BEARING SUPPORT MODULE | | | | | | | | | |
| ▶ Continue | 221 - SHAFT - FAN | 301-579-117-0 | JN00 | 20199 | 12708 | 25000 | 12292 | | |

FIG. 5A

| 31X - HPC ROTOR MODULE | | | | | | |
|---|---|---|---|---|---|---|
| ▶ Continue | 312 - SHAFT - HPC | 9511M57P01 | GWN | 22564 | 9672 | 20000 | 10328 |
| ▶ Continue | 313 - SPOOL STG 1-2 | 9992M60G07 | MPO | 22564 | 9672 | 20000 | 10328 |
| ▶ Continue | 314 - DISK STG 3 | 9940M55P13 | GWN | 22564 | 9672 | 20000 | 10328 |
| ▶ Scrap | 315 - SPOOL STG 4-9 | 9513M93G04 | GWN | 22564 | 9672 | 11200 | 1528 | 72-353 |
| ▶ Continue | 316 - SEAL ROT REAR AIR | 9514M68P01 | MPO | 22564 | 9672 | 18500 | 8828 |

| 52X - HPT ROTOR MODULE | | | | | | |
|---|---|---|---|---|---|---|
| ▶ Continue | 521 - SHAFT - FWD | 1441M26P02 | GWN | 20892 | 8599 | 17236 | 8637 |
| ▶ Continue | 522 - SEAL - FWD AIR | 1282M72P05 | GWN | 2954 | 1163 | 13100 | 11937 |
| ▶ Continue | 525 - DISK - HPT | 1475M29P02 | GWN | 2954 | 1163 | 16600 | 15437 |
| ▶ Continue | 526 - SHAFT - REAR | 9514M67P06 | APV | 19079 | 8680 | 25900 | 17220 |

Called-Out LLP Replacements

Any LLP not marked as "Continue" or "Rework" above will be listed here. By default, each part is marked for replacement with a new part.

If you wish to replace the part with a used serviceable part, move the mouse pointer over the Action column entry for the part and click the left mouse button.

The system will prepare a page of parts for the specified IIN which are marked in ERS as spares. Be patient, this can take several minutes.

84 →

85 →

| LLP | P/N | S/N | Total | | | 2-C1 | | Action |
|---|---|---|---|---|---|---|---|---|
| | | | Hours Used | Cycles Used | Cycle Limit | Cycles Left | | |
| 315 - SPOOL STG 4-9 | (NEW) | (NEW) | 0 | 0 | 11200 | 11200 | | Replace With Used Serviceable |

[ <u>Home</u> | <u>Special Items</u> | <u>*Life Limited Parts*</u> | <u>Mandatory SB's</u> | <u>Shop Modules</u> | <u>Required SB's</u> | <u>*Help*</u> ]

[ Home | Special Items | Life Limited Parts | *Mandatory SB's* | Shop Modules | Required SB's | *Help* ]  ⟵ 90

Mandatory Service Bulletins

To indicate that a bulletin should be complied with during this shop visit, click on its Comply With button. Whether or not a bulletin is to be complied with this shop visit, you may enter instructions/comments into its Instructions field. After all the changes have been made, click on the Update Workscope button at the bottom of the page. This will commit all the changes to the workscope database.

A mandatory service bulletin must be complied with during this shop visit if it is *open*.

An open service bulletin has nothing in its Status column which means that no compliance records were found for this bulletin. See the Compliance Records column for details of the compliance records that were found for this bulletin.

| Shop Module | Bulletin Number | Status | Comply With | Instructions | Description | Compliance Records |
|---|---|---|---|---|---|---|
| 21X - FAN ROTOR MODULE (Do Not Remove) | | | | | | |
| 21X | 72-629 | NA | ☐ | | REPL OF FAN DISKS (-3/72-545) | 21X (rev 0) 06-JUN-96 - HA |
| 21X | 72-748 | CW | ☐ | | RWK STG 1 VANE INR SHROUD - FAN & BOOSTER ASSY | 21X (rev 0) 24-JUL-96 - HA |

FIG. 6A

| | | | | |
|---|---|---|---|---|
| 22X - NO 1 & 2 BEARING SUPPORT MODULE (Do Not Remove) | | | | |
| 22X | 72-278 | NA | ☐ | FLEXIBLE BORESCOPE INSP OF NO. 2 BRG NUT & KEYWASHER POSITION | 22X (rev 0) 28-JUL-96 - 53 |
| 23X - FAN FRAME MODULE (Do Not Remove) | | | | |
| 23X | 72-466 | PCW | ☐ | REPOSITIONING OF VBV SIGNAL TUBE | 23X (rev 0) 28-JUL-96 - 53<br>91X (rev 0) 28-JUL-96 - HA |
| 31X - HPC ROTOR MODULE (Level 3) | | | | |
| 31X | 72-280 | NA | ☐ | REPLACEMENT OF SUSPECT COMPRESSOR ROTOR FORWARD SHAFTS | 31X (rev 0) 06-JUN-96 - HA |
| 31X | 72-517 | NA | ☐ | ULTRASONIC INSPECTION HIGH PRESSURE COMPRESSOR STAGE 1 BLADES | 31X (rev 0) 28-JUL-96 - 53 |
| 31X | 72-546 | NA | ☐ | ULTRASONIC INSP OF HPC STAGE 1 BLADES FOR DOVETAIL PRESS FACE CRKS | 31X (rev 0) 28-JUL-96 - 53 |

| ESN: | Model: CFM56-3 | Customer: | TSN: 35055 | CSN: 29026 |
|---|---|---|---|---|
| W/O: | Contract TT: | CSM: | TSV: 12747 | CSV: 12747 |
| CUST#: | AND# | Engr: | Est Arrival: | |
| Overtemp: | | | Arrival/Input: | 10 Aug 1998 |
| Removal Cause: | HIGH EGT - PERF. DET. | CFG REQ: 3-B1 | Ship/TAT: | 28 Sep 1998 |
| Workscope: | | Cont.: | EGTM/FnM/N2: | |

↖ 102

| W/S | + | Date | Mod | Item | Comments | Spec |
|---|---|---|---|---|---|---|
| SW90X1 | | / | 90X | Input/Incoming Inspect | | |
| SW90X3 | | / | 90X | A/R Test | | |
| SW90X | | / | 90X | D/A Eng to M/M | | |
| SW90EC | | / | - | Engine Cart | | |
| SWLRUF | | / | - | LRU Items on Fan M/M | | |
| SW20X2 | | / | 20X | D/A Fan/Fan Cart | | |
| SW20X2 | | / | 21X | FAN ROTOR MODULE | | |
| SW20X2 | | / | 22X | NO 1 & 2 BEARING SUPPORT | | |
| SW20X2 | | / | 23X | FAN FRAME MODULE | | |

| | |
|---|---|
| Booster Spool | Replace[1] |
| Fan Disk | Replace[2] |
| Fan Shaft | Replace[3] |
| HPC Fwd Shaft | NEW |
| 1-2 Spool | NEW |
| Stage 3 Disk | NEW |
| 4-9 Spool | NEW |
| CDP Seal | NEW |
| HPT Fwd Shaft | NEW |
| HPT Seal | NEW |

106

| | |
|---|---|
| HPT Disk | NEW |
| HPT Aft Shaft | NEW |
| LPT S1 Disk | NEW |
| LPT S2 Disk | NEW |
| LPT S3 Disk | NEW |
| LPT S4 Disk | NEW |
| Con Support | NEW |
| LPT Shaft | Continue |
| Stub Shaft | NEW |
| Limit Item | |

FIG. 7B

Open Service Bulletins

\*   This bulletin is mandatory.

✓   This bulletin has been selected for compliance.

○   There is not enough exposure to force compliance.

108

| IIN | Bulletin | | Description | Other IINs | Comment |
|-----|----------|---|-------------|------------|---------|
| 21X | 72-191 | ✓ | NEW BOOSTER STAGE 3 VANE ASSY WITH TWO BOTTOM HOLES TO AVOID WATER ACC | | |

| IIN | Bulletin | | Description | Other IINs | Comment |
|-----|----------|---|-------------|------------|---------|
| 23X | 72-387 | ○ | IMPROVEMENT OF FRONT SECTION DRAINAGE | | |
| 23X | 72-412 | ○ | ADDITIONAL WASHER AT VSV CABLE ATTACHMENT BRKTS | 56X91X | |

| IIN | Bulletin | | Description | Other IINs | Comment |
|-----|----------|---|-------------|------------|---------|
| 31X | 72-053 | ✓ | HIGH PRESSURE COMPRESSOR HPC-ADDITION OF HARDCOAT TO HPC AIRFOILS | | |
| 31X | 72-162 | ✓ | HPCR STAGE 4-9 SPOOL TO IMPROVE LCF LIFE 2/72-353 | | |
| 31X | 72-332 | ✓ | HPC STAGE 1 BLADE WITH RELIEVED DOVETAIL CORNERS 2/72-500 | | |
| 31X | 72-496 | ✓ | RMVL HIGH CYCLE STG 1 & 2 HPC BLADES -5/72-224 -2/72-634 | | |
| 31X | 72-512 | ✓ | ULTRA INSP STG1-2 SPL DVTL POSTS\*\*REPEATED SB\*\* -5/72-228R2 -2/72-545R3 | | |

FIG. 7C

110 _____ *Engine Services*

I. Incoming Workscope

TSN: 19079
                       TSV: 2954
                       CSN: 8680
                       CSV: 1163
           Removal Date: 20 OCT 1998
        Removal Station: FSD
Reason for Engine Removal: STALL/ROLL IN INVEST
   Engine Repair Category: ESV2
            Minimum build: 4004 cycles
         Build Thrust Class: 2-C1
Previous Shop Visit Summary: Shop visit #01: 09 Sep 1982 - HPT BLADE DISTRESS Work orders: NO WORKORDERS FOUND Shop visit #02: 05 Mar 1985 - VIBRATION NCF Work orders: NO WORKORDERS FOUND Shop visit #03: 07 Jun 1991 - FLAMEOUT-N. CAUSE FD Work orders: NO WORKORDERS FOUND Shop visit #04: 26 May 1996 - LLP HPT FRONT SHAFT Work orders: 538022 539315 539316

II. Shop Modules to Remove

| IIN | Module | Remove | Do Not Remove |
|---|---|---|---|
| 21X | FAN ROTOR MODULE | | ✓ |
| 22X | NO 1 & 2 BEARING SUPPORT MODULE | | ✓ |
| 23X | FAN FRAME MODULE | ✓ | |
| 31X | HPC ROTOR MODULE | ✓ | |
| 32X | HPC FWD STATOR MODULE | ✓ | |
| 33X | HPC REAR STATOR MODULE | ✓ | |
| 41X | COMBUSTION MODULE | | ✓ |
| 42X | COMBUSTION CHAMBER MODULE | | ✓ |
| 51X | HPT NOZZLE MODULE | | ✓ |
| 52X | HPT ROTOR MODULE | | ✓ |
| 53X | LPT NOZZLE MODULE | | ✓ |
| 54X | LPT MODULE | | ✓ |
| 55X | LPT SHAFT MODULE | | ✓ |
| 56X | LPT FRAME MODULE | ✓ | |
| 61X | IGB/NO 3 BRG MODULE | ✓ | |
| 62X | TGB MODULE | ✓ | |
| 63X | AGB - MODULE | | ✓ |
| 91X | TURBO FAN ENGINE | ✓ | |

| Prepared for GE by | For |
|---|---|
| Date | Date |
| Date | Date |

*Engine Services - Strother Shop*

FIG. 8

III. Life Limited Parts to Rework or Replace

A. Replace or rework for life extension the following LLPs. Continue time on all others, meeting the 4004 cycles minimum build standard per a ESV2 workscoped engine.

| IIN | LLP | Cycles | Instructions |
|---|---|---|---|
| 315 | SPOOL STG 4-9 | 1528 | 72-353 not appl. to s/n |

B. Continue time on the following LLPs that have less than the applicable required cycle life remaining:

| IIN | LLP | Cycles | Instructions |
|---|---|---|---|
| | (None) | | |

FIG. 9A

IV. Module Workscopes

| IIN | Module | Remove | Level | Instructions |
|---|---|---|---|---|
| 21X | FAN ROTOR MODULE | | 1 | Fan/Booster being removed only to allow visual inspection of Salad Bowl Seal. S/B 72-418 R class must be CW at next 100% disassy. |
| 22X | NO 1 & 2 BEARING SUPPORT MODULE | | 1 | Disassemble 100% to refurb salad bowl and vendor brgs for clean and inspect. |
| 23X | FAN FRAME MODULE | ✓ | 2 | |
| 31X | HPC ROTOR MODULE | ✓ | 3 | |
| 32X | HPC FWD STATOR MODULE | ✓ | 2 | |
| 33X | HPC REAR STATOR MODULE | ✓ | 2 | |
| 41X | COMBUSTION MODULE | | 1 | |
| 42X | COMBUSTION CHAMBER MODULE | | 1 | |
| 51X | HPT NOZZLE MODULE | | 1 | |
| 52X | HPT ROTOR MODULE | | 1 | |
| 53X | LPT NOZZLE MODULE | | 1 | |
| 54X | LPT MODULE | | 1 | |
| 55X | LPT SHAFT MODULE | | 1 | |
| 56X | LPT FRAME MODULE | ✓ | 2 | |
| 61X | IGB/NO 3 BRG MODULE | ✓ | 2 | All mandatory S/Bs PCW. No plan to remove module at this visit. S/B 72-236 R class must be CW at next 100% disassy. |
| 62X | TGB MODULE | ✓ | 2 | |
| 63X | AGB - MODULE | | 1 | |
| 91X | TURBO FAN ENGINE | ✓ | 2 | |

FIG. 9B

V. Special Workscope Items

| IIN | Item | Instructions | Required |
|---|---|---|---|
| 22X | Forward sump seal and bearing upgrade. (Mandatory compliance on esv-2 unless pcw less than 14,000 hours prior) | consider to remove brg supp. for seal upgrade | ✓ |
| 91X | Vibration preventive workscope. (Mandatory compliance on ESV-1 and 2 unless PCW) | | |
| 23X | Remove and rebond radial drive shaft inner hoursing. (Mandatory all shop visits unless PCW less than 14,000 hours prior) | | |

VI. Engine Test Requirements

None

VII. Additional Instructions/Comments

None

METHOD AND SYSTEM FOR PLANNING REPAIR OF AN AIRCRAFT ENGINE

BACKGROUND OF THE INVENTION

This invention relates to aircraft engines, and more specifically, to a computer implemented method and system for planning repair of an aircraft engine.

An aircraft engine is often removed from an aircraft, taken "off-wing", for servicing at a maintenance or repair shop for a number of reasons such as to repair damage to the aircraft engine, restore operating performance of the aircraft engine, inspect or repair safety flaws in the aircraft engine, or upgrade the aircraft engine for increased operating life.

During servicing of the aircraft engine for the above-noted reasons, the U.S. Federal Aviation Administration (FAA) requires compliance with regulations regarding inspection, refurbishment, and/or replacement of life limited parts (LLPs). LLPs are parts in the aircraft engine that have a limited operating life often defined as having a limited number of permitted cycles. A cycle is an excursion from idle to takeoff power and back. For example, a cycle occurs in a typical flight that has a takeoff and landing including thrust reverser. Another example of a cycle is a touch-and-go landing and takeoff used for pilot training.

Typically, at a repair shop, a service manager receives a package of documents containing the reason or reasons that the aircraft engine was removed from the wing of the aircraft for repair (e.g., damage, inspection, etc.), the customer's request that the engine be repaired to achieve a certain build level, the remaining life of each of the LLPs in the aircraft engine, FAA regulations regarding LLPs for the aircraft engine, and service bulletins for the aircraft engine such as requirements for repair or inspection of parts, replacement of defective parts, or incorporation of manufacturer design changes. The service manager reviews the documents and develops a workscope planning document which is a general outline of the specific repairs to be performed to the aircraft engine. The developed workscope planning document is then reviewed, and if approved by the customer, the aircraft engine is then repaired.

A drawback of the current procedure is that the review by the service manager of the compiled data is labor intensive and time consuming. As a result, a specific FAA regulation or service bulletin may fail to be addressed so that the aircraft engine must then be later removed from the aircraft and properly repaired, or a specific FAA regulation or service bulletin may be inadvertently requested. Another drawback is that the collection of the information provided to the service manager is a tedious, labor-intensive process.

Therefore, there is a need for a system which reduces the time and effort in collecting and maintaining information regarding an aircraft engine and service requirements, and which allows the service manager to plan repair or overhaul of the aircraft engine in less time and with increased accuracy thereby reducing the cost for repair of the aircraft engine.

SUMMARY OF THE INVENTION

The above-mentioned needs are met by the present invention which provides a computer implemented method for planning repair of an aircraft engine. The computer implemented method includes the steps of retrieving engine configuration data for a plurality of life limited parts for the aircraft engine, retrieving service requirement data for at least one of the plurality of life limited parts for the aircraft engine, and automatically determining a remaining life for the at least one of the plurality of the life limited parts of the aircraft engine from the engine configuration data and the service requirement data.

Desirably, the step of retrieving engine configuration data comprises retrieving a predetermined build level, and the method further comprises the step of automatically determining whether the remaining life of the at least one of the plurality of life limited parts of the aircraft engine is less than the predetermined build level. Advantageously, the computer implemented method may include the step of ascertaining an engine module for the at least one of the plurality of life limited parts, retrieving service requirement data for the engine module, and presenting the service requirements arranged by the engine module for evaluation by a service manager.

BRIEF DESCRIPTION OF THE DRAWINGS

FIG. 4 is a screen view of the display of the system shown in FIG. 1 displaying a web page for inputting data for planning repair of the aircraft engine;

FIG. 5 is a screen view of the display of the system shown in FIG. 1 displaying life limited parts of the aircraft engine;

FIG. 6 is a screen view of the display of the system shown in FIG. 1 displaying mandatory service bulletins which apply to the aircraft engine;

FIG. 7 is a printout from the system shown in FIG. 1 of a workscope planning document for repair of the aircraft engine; and FIGS. 8 and 9 are printouts from the system shown in FIG. 1 of a signoff document for repair of the aircraft engine.

DETAILED DESCRIPTION OF THE INVENTION

Figure 1:
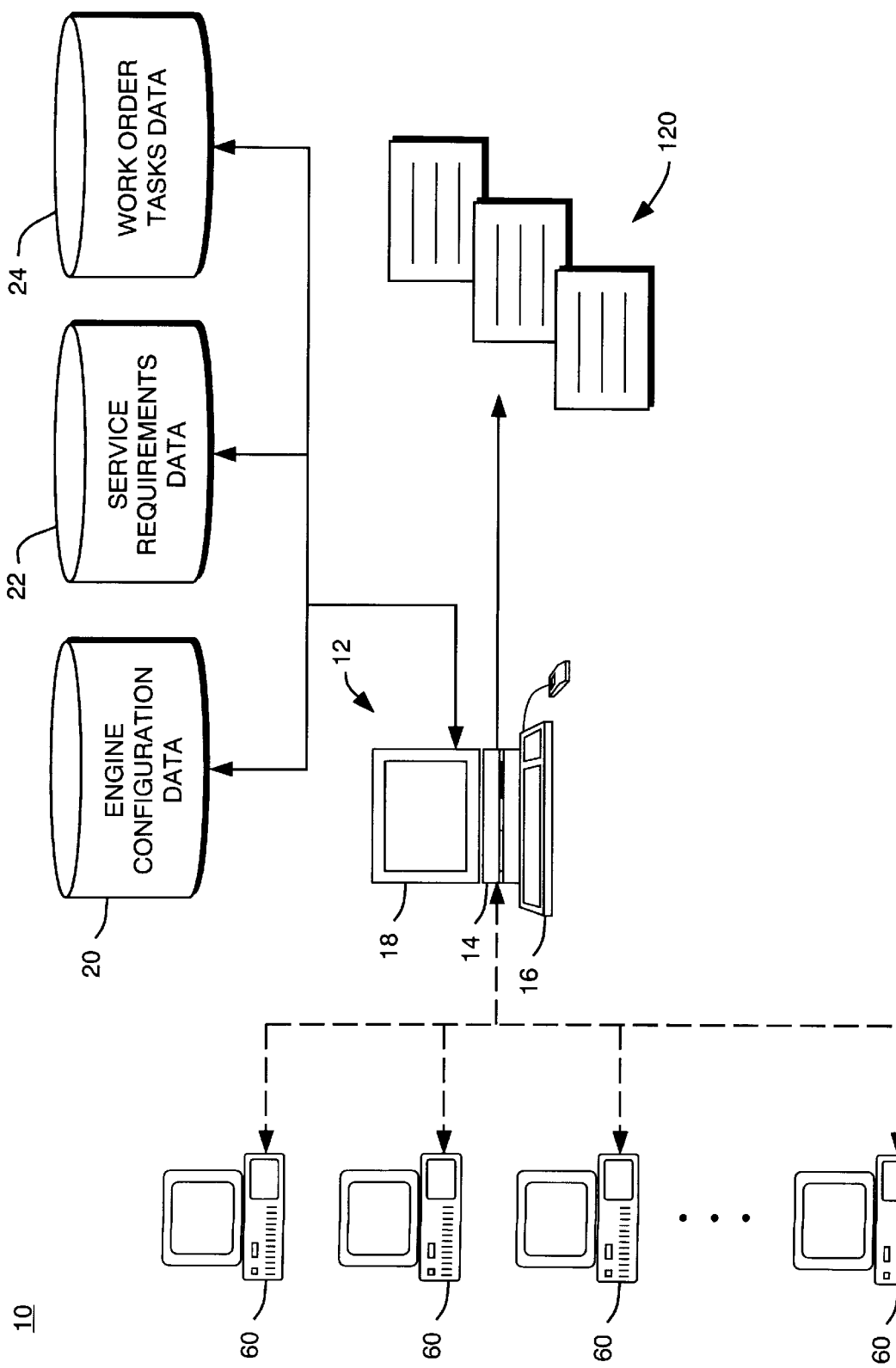
FIG. 1 is a block diagram of a system for planning repair of an aircraft engine according to the present invention.

FIG. 1 diagrammatically illustrates one embodiment of a system 10 according to the present invention for planning repair or overhaul of an aircraft engine such as when the aircraft engine is removed from the aircraft for servicing to repair damage to the aircraft engine, restore operating performance of the aircraft engine, inspect or repair safety flaws in the aircraft engine, or upgrade the aircraft engine for increased operating life.

Exemplary system 10 includes a processor 12 such as a computer 14 (e.g., Sun Sparc) having a hard drive, input devices such as a keyboard 16, a mouse, magnetic storage media (e.g., tape cartridges or disks), optical storage media (e.g., CD-ROMs), and output devices such as a display 18 and a printer. Processor 12 is operably connected to and processes data contained in data storage units 20, 22, and 24.

Data storage unit 20 includes aircraft engine configuration data or records regarding a plurality of aircraft engines. For example, the fields of a record for an aircraft engine may include the serial number of the aircraft engine, the manufacturer of the aircraft engine, the owner of the aircraft engine, the listing or identification of the LLPs in the aircraft engine, the use of each of the LLPs since new, identification of the engine module for each of the LLPs (e.g., where the LLP is located in the aircraft engine), and a predetermined or suggested build level for the aircraft engine (e.g., a desired remaining life of the aircraft engine).

Data storage unit 22 includes service requirement data or records regarding a plurality of LLPs and aircraft engines such as FAA regulations and service bulletins. The fields of a record may include an identification of the LLP (e.g., name and serial number), the maximum permitted use or life for the LLP, and requirements for inspection, repair, or replacement of LLPs or other parts in the aircraft engine.

Figure 2:
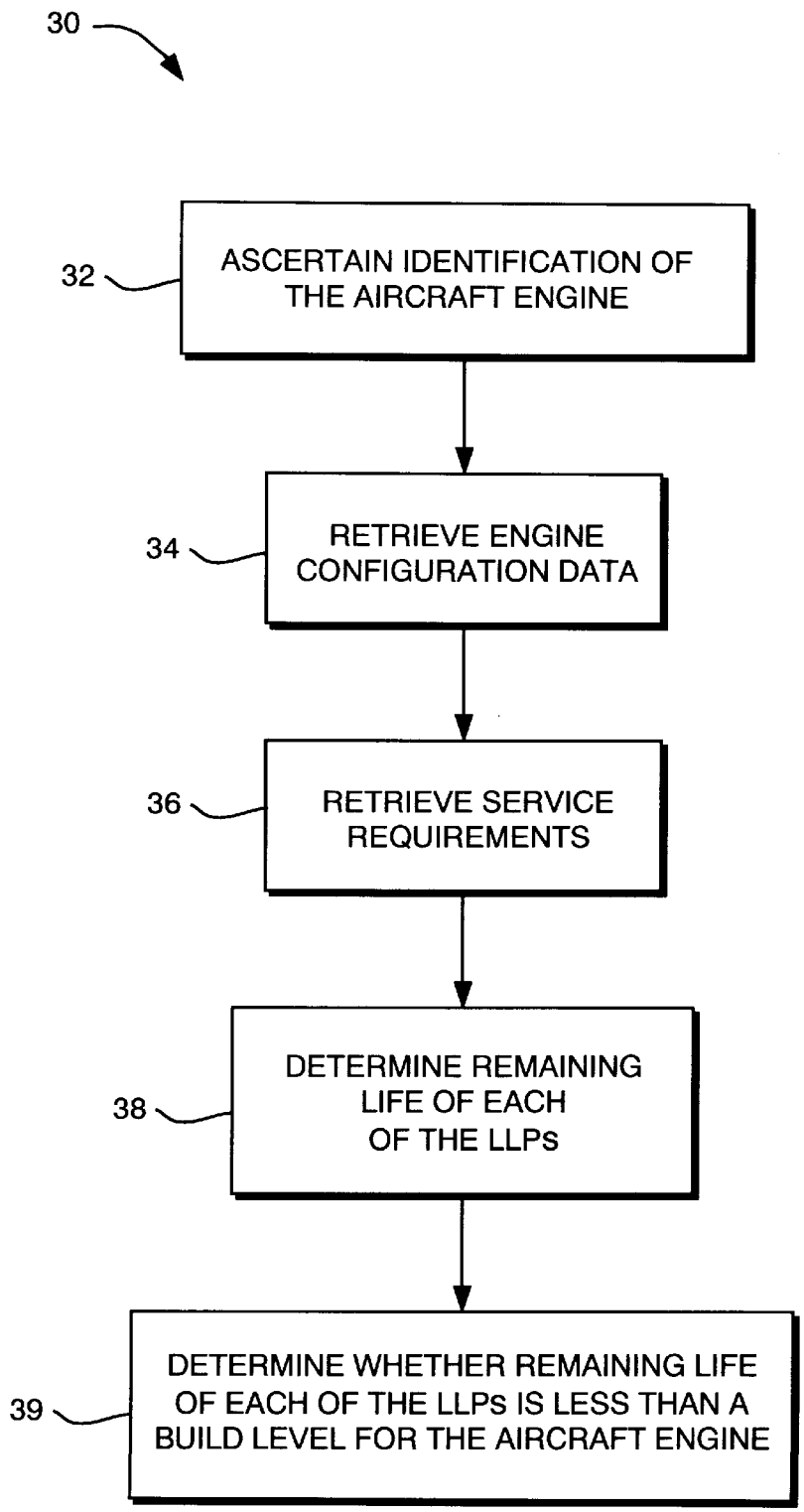
FIG. 2 is a flowchart illustrating one embodiment of the general operation of the system shown in FIG. 1.

FIG. 2 is a flowchart of an exemplary process 30 illustrating the general operation of system 10 according to the present invention. In this exemplary embodiment, at 32, an identification such as the engine model number or engine serial number of the aircraft engine is ascertained.

Given the identification of the aircraft engine, the present invention searches data storage unit 20 (FIG. 1) for engine configuration data for a plurality of LLPs for the aircraft engine at 34. The present invention then searches data storage unit 22 (FIG. 1) and retrieves the maximum permitted use or life for each of the plurality of LLPs at 36. Then, at 38, the remaining use or life of each of the plurality of LLPs is determined which allows, at 39, determining and identifying those LLPs not satisfying a predetermined build level.

Figure 3:
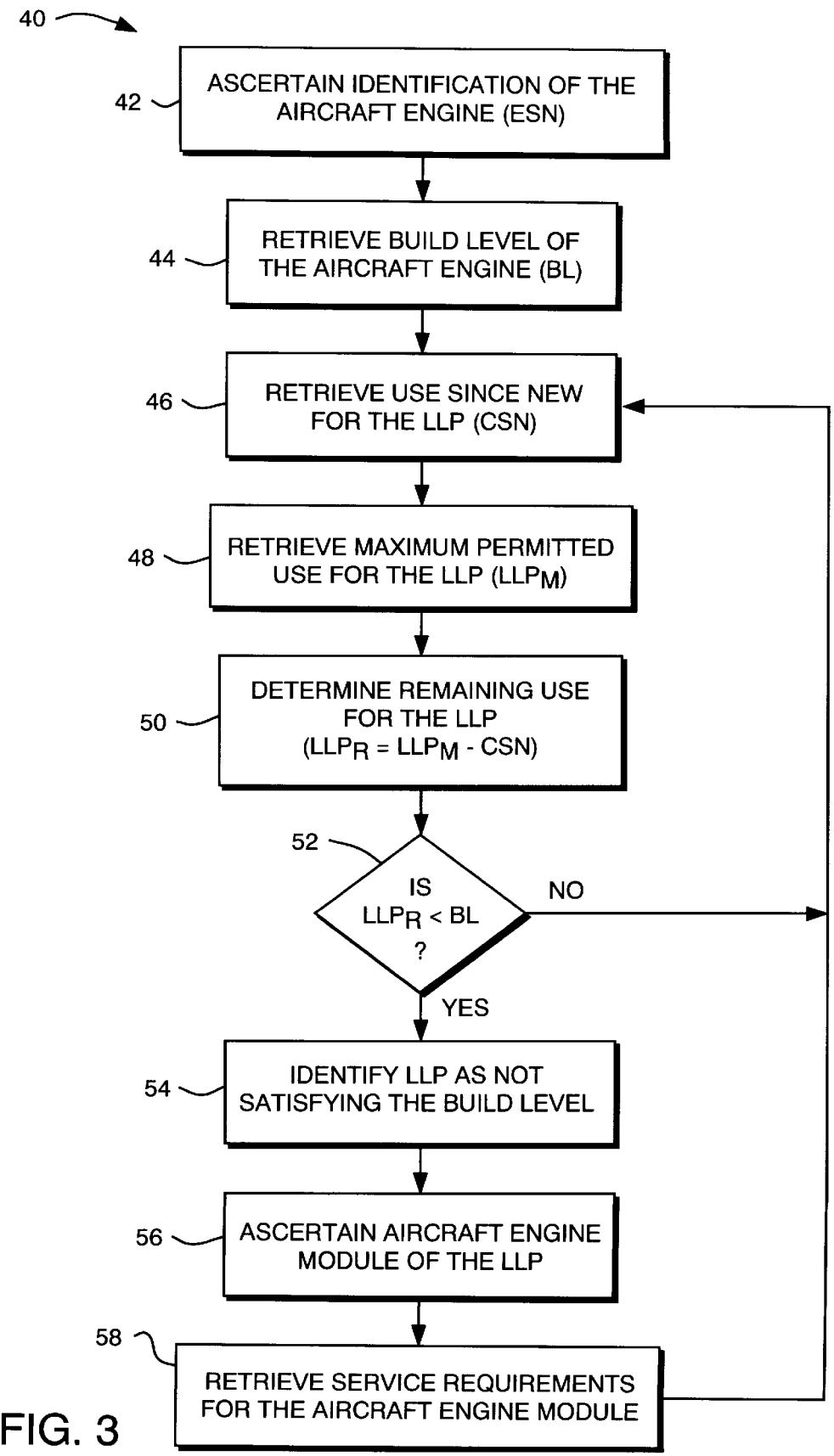
FIG. 3 is a flowchart illustrating, in greater detail, the operation of the system shown in FIG. 1.

FIG. 3 is a flowchart of an exemplary process 40 illustrating another embodiment of the operation of system 10 for determining the remaining use or life for a plurality of LLPs of an aircraft engine and identifying those LLPs of the aircraft engine not satisfying a build level. With reference to this exemplary process, at 42, the identification of the aircraft engine such as the aircraft engine serial number (ESN) is ascertained. A desired predetermined build level (BL) of the aircraft engine and the use of the LLP since new (CSN) are ascertained from data storage unit 20 (FIG. 1), at 46 and 48, respectively. At 48, the maximum permitted use for a first LLP ($LLP_M$) is ascertained from data storage unit 22 (FIG. 1).

Given the inputs obtained at 46 and 48, the remaining use or life for the LLP ($LLP_R$) is determined at 50 by subtracting the predetermined amount of use of the life limited part since new (CSN) from the maximum amount of use permitted for the life limited part ($LLP_M$). A determination is made as to whether the remaining use for the LLP ($LLP_R$) is less than the build level (BL) at 52. If the remaining use or life of the LLP ($LLP_R$) is greater than the build level (BL) the process returns to 46 to repeat the process with a second LLP of the aircraft engine. If the remaining use or life ($LLP_R$) is less than the build level then the LLP is identified as not satisfying the build level at 54.

Given an LLP not satisfying the build level, desirably at 56, exemplary process 40 includes searching and retrieving from data storage unit 20 (FIG. 1), the location or engine module in which the identified LLP is located in the aircraft engine. At 58, data storage unit 22 (FIG. 1) is then searched and the service requirements corresponding to the aircraft engine and the engine module are retrieved. Thereafter, the process is again repeated with the next LLP of the aircraft engine.

The above described processes for determining the remaining use or life for LLPs based on a predetermined build level may comprise quantifying the use or life in hours or cycles. In addition, the build level may comprise two components such as build cycles and build usage. Build cycles are the minimum number of cycles remaining on any of the LLPs at the conclusion of the current shop visit. Put another way, at the conclusion of the shop visit, each LLP will have at least this many cycles of life remaining, if not more. Build usage is the thrust class rating of the engine at the conclusion of the current shop visit. Some engine models can be configured to a small number (2–4) of different thrust ratings. These ratings have designations such as C1, B1, etc. and correspond to some number of pounds of thrust. Build cycles and build usage are desirable, for example, where the aircraft engine will be operated at an increased thrust level which may reduce the standard use or life typically permitted for the LLP. In such a case, both the build cycles for the aircraft engine and the maximum permitted cycles for the LLPs may be decreased as a function of the build usage.

FIG. 4 is an example of a screen view 70 of a web page for use by a service manager for accessing and using system 10. For planning repair of an aircraft engine, initially the service manager inputs the aircraft engine serial number (ESN). Desirably, the system retrieves and displays configuration data corresponding to the aircraft engine such as the build cycles 72, the build usage 74, the time since new (TSN) for the aircraft engine, the time since last shop visit (TSV) for the aircraft engine, the cycles since new (CSN), and the cycles since last shop visit (CSV), from data storage unit 20 via cross-referencing with the aircraft engine serial number. The service manager can edit the values for the retrieved configuration data of the aircraft engine or if a value is not available from data storage unit 20, the service manager can supply a value. From the present description, it will be appreciated that configuration data for the aircraft engine may be supplied to data storage unit 20 of the system by the customer (e.g., airline or air freight company).

FIG. 5 is an example of a LLPs screen view 80, which in a top portion 82 thereof lists preferably all the LLPs arranged by module and in a bottom portion thereof lists the LLPs requiring replacement. Desirably, in top portion 82, a column 86 is provided which lists the cycles left or remaining for each of the listed LLPS, and column 88 lists the cycles left or remaining for the predetermined build usage (which may be determined, as described above).

In this example, the service manager can simply accept the suggested replacement of the single listed part 85, i.e., SPOOL STG. However, with the present invention, the service manager may readily review the list of LLPs to determine whether any other repairs should also be made to the aircraft engine. As shown in FIG. 5, displayed in module 31X is a part 87, i.e., SEAL ROT REAR AIR having 8828 cycles remaining. A service manager can quickly review this information, review the remaining life each of for the other LLPs in module 31X and make a determination as to whether to replace this part as well, for example, so that all the LLPs in this module have a substantially similar remaining life or so that at the next shop visit module 31X will not require repair.

FIG. 6 is an example of a mandatory service bulletins screen view 90 for inspection, repair or replacement of parts relating to the various engine modules of the aircraft engine. A service manager can review the information provided and arranged by modules, and determine whether any of the service bulletins should be compiled with. Desirably, if a service bulletin is required to be complied with such as when a module will be opened due to replacement of an LLP, a check can appear in the "Comply With" column 92.

Additional screen views may include special items (e.g., the customer or airline's special requested items for repair, inspection, etc.), and required service bulletins which may be presented in a similar manner, as described above, and illustrated with reference to mandatory service bulletins.

After the service manager has viewed and evaluated the various screens, a workscope planning document may be readily generated and printed out. An example of a workscope planning document 100 is shown in FIG. 7 for review by the service manager for the repair or overhaul of the aircraft engine. A section 102 of workscope planning document 100 identifies the aircraft engine and various configuration data. A section 104 provides a list of high level work orders corresponding to repair of the LLPs and implementation of service bulletins. A section 106 lists the LLPs by name, and a section 108 lists the service bulletins applicable to the aircraft engine and indicates whether the bulletin has been selected for compliance. It will be appreciated that the workscope planning document may also be displayed on monitor 18 of system 10. FIGS. 8 and 9 are printouts from system 10 for a signoff sheet 110 for review by the customer for approval and signatures prior to performing the repair to the aircraft engine.

With reference again to FIG. 1, desirably system 10 includes a data storage unit 24 operably connected to processor 12 and having data or records for a plurality of work tasks for repair of the aircraft engine. The work tasks may be selected based on the developed workscope planning document and processed for generating a work order 120 for use on the shop floor in the repair or overhaul of the aircraft engine.

In addition to system 10 being accessible by service managers and customers via processor 12, the system is desirably accessible via a plurality of terminals or personal computers 60 which may be linked via a global network system, e.g., the Internet, for preparing workscope planning documents for the repair or overhaul of aircraft engines. This allows repair or overhaul of aircraft engines at the any of a number of repair or maintenance shops so that the aircraft engine can be preferably transported to the closest repair shop rather than to the repair shop where the aircraft engine has been repaired and at which documentation for the aircraft engine is maintained.

From the present description, the present invention provides ready access to and compactly configures the necessary information required for the service manager to quickly evaluate and generate a workscope planning document which reduces the likelihood of one or more LLPs requiring replacement during the service are not replaced or of requiring one or more LLPs not requiring replacement being unnecessarily replaced. In addition, the present invention reduces the likelihood of one or more service bulletins not being addressed or inadvertently being implemented during the repair of the aircraft engine.

Furthermore, data storage units 22 and 24 are readily maintained and updated so that at the next repair of the aircraft engine, the system may require only inputting the identification of the aircraft engine and the use of the aircraft since the last shop visit. In addition, it will be appreciated that the engine configuration data, service requirement data, and work task data may be contained and maintained in a single data storage unit, the separate data storage units, as described and illustrated, or in any number of data storage units.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments failing within the scope of the appended claims.

What is claimed is:

1. An article of manufacture comprising:

at least one computer usable medium having computer readable program code means embodied therein for causing the planning of repair of an aircraft engine, the computer readable program code means in said article of manufacture comprising:

retrieving engine configuration data for a plurality of life limited parts for the aircraft engine;

retrieving service requirement data for at least one of the plurality of life limited parts for the aircraft engine;

automatically determining a remaining life for the at least one of the plurality of life limited parts of the aircraft engine from said engine configuration data and said service requirement data; and generating a planning document for repairing the aircraft engine according to the determined remaining life for the at least one of the plurality of life limited parts.

2. The article of manufacture of claim 1, wherein said retrieving engine configuration data comprises retrieving a predetermined build level, and further comprising automatically determining whether the remaining life of the at least one of the plurality of life limited parts of the aircraft engine is less than the predetermined build level.

3. A system for planning repair of an aircraft engine, comprising:

means for retrieving engine configuration data for a plurality of life limited parts for the aircraft engine;

means for retrieving service requirement data for at least one of the plurality of life limited parts for the aircraft engine;

means for automatically determining a remaining life for the at least one of the plurality of life limited parts of the aircraft engine from said engine configuration data and said service requirement data; and means for generating a planning document for repairing the aircraft engine according to the determined remaining life for the at least one of the plurality of life limited parts.

4. The system of claim 3, wherein said means for retrieving engine configuration data comprises means for retrieving a predetermined amount of use for the at least one of the plurality of life limited parts since new, and said means for retrieving service requirement data comprises means for retrieving a maximum amount of use permitted for the at least one of the plurality of life limited parts.

5. The system of claim 4, wherein said means for automatically determining the remaining life for the at least one of the plurality of life limited parts comprises means for automatically subtracting the predetermined amount of use of the at least one of the plurality of life limited parts since new from the maximum amount of use permitted for the at least one of the plurality of life limited parts.

6. The system of claim 3, wherein said means for retrieving engine configuration data comprises ascertaining an identification of the aircraft engine and means for retrieving an identification for each of the life limited parts from a first data storage unit corresponding to the identification of the aircraft engine.

7. The system of claim 6, wherein said means for retrieving service requirement data comprises means for retrieving service requirement data from a second data storage unit corresponding to each of the identifications for the life limited parts.

8. The system of claim 3, wherein said means for retrieving engine configuration data comprises means for retrieving a predetermined build level, and further comprising means for automatically determining whether the remaining life of the at least one of the plurality of life limited parts of the aircraft engine is less than the predetermined build level.

9. The system of claim 8, further comprising means for automatically identifying at least one of the plurality of life limited parts of the aircraft engine having a remaining life less than the predetermined build level.

10. The system of claim 8, further comprising means for automatically providing a work order identifying at least one work task for the at least one of the plurality of life limited parts having a life less than the predetermined build level.

11. The system of claim 8, further comprising means for ascertaining an engine module for each of the life limited parts, means for retrieving service requirement data for each of the engine modules, and means for automatically presenting the service requirement data arranged by the engine module for evaluation by a service manager.

12. A computer implemented method for planning repair of an aircraft engine, comprising:

retrieving engine configuration data for a plurality of life limited parts for the aircraft engine;

retrieving service requirement data for at least one of the plurality of life limited parts for the aircraft engine;

automatically determining a remaining life for the at least one of the plurality of life limited parts of the aircraft engine from said engine configuration data and said service requirement data; and generating a planning document for repairing the aircraft engine according to the determined remaining life for the at least one of the plurality of life limited parts.

13. The computer implemented method of claim 12, wherein said retrieving engine configuration data comprises retrieving a predetermined amount of use for the at least one of the plurality of life limited parts since new, and said retrieving service requirement data comprises retrieving a maximum amount of use permitted for the at least one of the plurality of life limited parts.

14. The computer implemented method of claim 13, wherein said automatically determining the remaining life for the at least one of the plurality of life limited parts comprises automatically subtracting the predetermined amount of use of the at least one of the plurality of life limited parts since new from the maximum amount of use permitted for the at least one of the plurality of life limited parts.

15. The computer implemented method of claim 12, wherein said retrieving engine configuration data comprises ascertaining an identification of the aircraft engine and retrieving an identification for each of the life limited parts from a first data storage unit corresponding to the identification of the aircraft engine.

16. The computer implemented method of claim 15, wherein said retrieving service requirement data comprises retrieving service requirement data from a second data storage unit corresponding to each of the identifications for the life limited parts.

17. The computer implemented method of claim 12, wherein said retrieving engine configuration data comprises retrieving a predetermined build level, and further comprising automatically determining whether the remaining life of the at least one of the plurality of life limited parts of the aircraft engine is less than the predetermined build level.

18. The computer implemented method of claim 17, further comprising automatically identifying at least one of the plurality of life limited parts of the aircraft engine having a remaining life less than the predetermined build level.

19. The computer implemented method of claim 17, further comprising automatically providing a work order identifying at least one work task for the at least one of the plurality of life limited parts having a life less than the predetermined build level.

20. The computer implemented method of claim 17, further comprising ascertaining an engine module for each of the life limited parts, retrieving service requirement data for each of the engine modules, and automatically presenting the service requirement data arranged by the engine module for evaluation by a service manager.

\* \* \* \* \*